United States Patent
Mizutori et al.

(10) Patent No.: US 7,313,263 B2
(45) Date of Patent: Dec. 25, 2007

(54) METHOD AND APPARATUS FOR MEASURING COAXIAL RELATION BETWEEN TWO MECHANICAL PARTS

(75) Inventors: Kazunori Mizutori, Kariya (JP); Tatsuya Nakagi, Kariya (JP)

(73) Assignee: DENSO Corporation, Kariya (JP)

( * ) Notice: Subject to any disclaimer, the term of this patent is extended or adjusted under 35 U.S.C. 154(b) by 701 days.

(21) Appl. No.: 10/932,714

(22) Filed: Sep. 2, 2004

(65) Prior Publication Data

US 2005/0053272 A1   Mar. 10, 2005

(30) Foreign Application Priority Data

Sep. 10, 2003   (JP) .............. 2003-318706

(51) Int. Cl.
- G06K 9/00 (2006.01)
- H04N 9/47 (2006.01)
- H04N 7/18 (2006.01)
- G01B 5/28 (2006.01)
- G01B 5/30 (2006.01)
- G06F 19/00 (2006.01)

(52) U.S. Cl. .............. 382/151; 382/152; 348/94; 348/95; 702/35

(58) Field of Classification Search ............... 382/151, 382/152, 294; 348/94, 95; 702/35
See application file for complete search history.

(56) References Cited

U.S. PATENT DOCUMENTS 6,604,379 B2   8/2003   Hotta et al.

FOREIGN PATENT DOCUMENTS

JP   2003-097499   4/2003

Primary Examiner—Samir Ahmed
Assistant Examiner—Randolph Chu
(74) Attorney, Agent, or Firm—Harness, Dickey & Pierce, PLC

(57) ABSTRACT

According to a measuring method, shapes of two mechanical parts of a measuring object are shot by a camera at their respective axial both ends so that image information of the shapes are obtained. Then a center coordinate of the detected shape is respectively calculated from the image information, and positions of the axial lines for the two mechanical parts are calculated from the calculated center coordinates, and finally the calculated position of the axial line is compared with the calculated position of the other axial line in a certain determination area, to determine the coaxial relation between the two mechanical parts.

12 Claims, 3 Drawing Sheets

FIG. 4

- 101: SHOOTING THE SHAPE AT FOUR DIFFERENT MEASURING POINTS BY MOVING A CAMERA
- 102: CALCULATING CENTER COORDINATES C, D, E AND F FROM THE IMAGE INFORMATION FROM THE CAMERA
- 103: CALCULATING A REFERENCE LINE LA FROM THE CENTER COORDINATES C AND D. (CALCULATING AN AXIAL LINE SA FROM THE CENTER COORDINATES E AND F)
- 104: EXTENDING THE REFERENCE LINE LA AND CALCULATING THE CENTER COORDINATES G AND H IN A DETERMINATION AREA B
- 105: CALCULATING A DEVIATION BETWEEN E AND G AND A DEVIATION BETWEEN F AND H
- 106: DOUBLING THE DEVIATION, WHICH IS LARGER THAN THE OTHER ONE, AND DETERMINING THE COAXIAL RELATION

FIG. 5

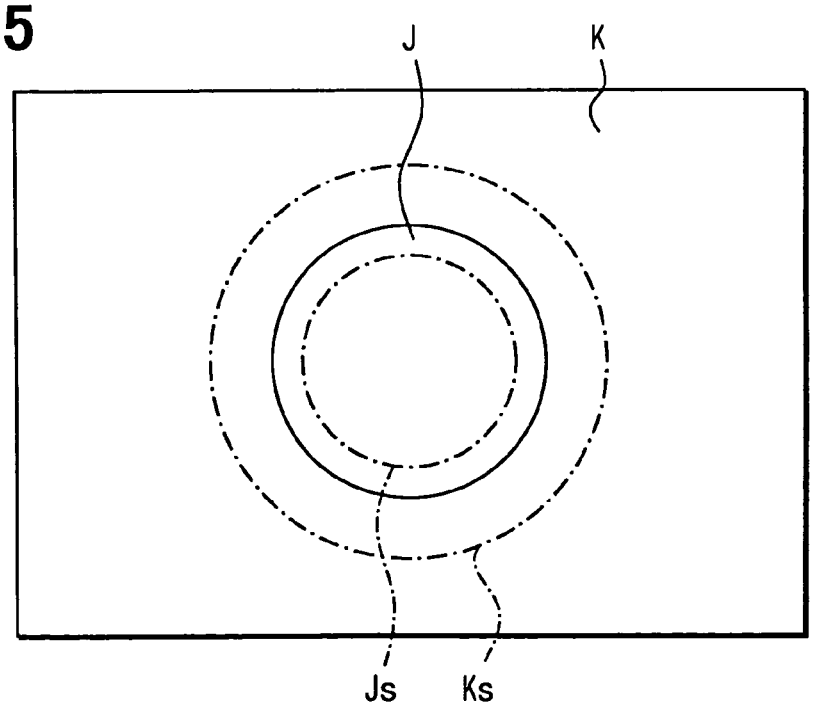

METHOD AND APPARATUS FOR MEASURING COAXIAL RELATION BETWEEN TWO MECHANICAL PARTS

CROSS REFERENCE TO RELATED APPLICATION

This application is based on Japanese Patent Application No. 2003-318706 filed on Sep. 10, 2003, the disclosure of which is incorporated herein by reference.

FIELD OF THE INVENTION

This invention relates to a method and apparatus for measuring a coaxial relation between two mechanical parts, which will be arranged in the same axial line.

BACKGROUND OF THE INVENTION

A 3-dimensional measuring apparatus or a circularity measuring apparatus is known in the art for measuring a coaxial relation between two mechanical parts which are arranged to have a common axial line.

In these prior art measuring apparatuses, a contact type measuring device is moved on measuring objects, being in contact with the measuring objects, to define configurations of those mechanical parts and finally measure the coaxial relation between those two mechanical parts.

It is, however, disadvantageous in the above prior art apparatuses using the contact type measuring device, in that it would become difficult or impossible to define the configuration of the parts and to measure the coaxial relation in the case that the parts have complicated configuration. For example, in the case that the part of the measuring object has a long cylindrical portion and a cylindrical inner surface with a small diameter will be measured, a measuring device having a slender arm will be necessary. However, when the measuring device is made longer, a rigidity of the measuring device is decreased to decrease measuring accuracy.

SUMMARY OF THE INVENTION

The present invention is made in view of the above problems, and it is an object of the present invention to provide a measuring method and apparatus without a contact type measuring device, to measure a coaxial relation between two mechanical parts.

According to one of features of the present invention, shapes of two mechanical parts of a measuring object are shot by a camera at their respective axial both ends so that image information of the shapes are obtained. Then a center coordinate of the detected shape is respectively calculated from the image information, and positions of the axial lines for the two mechanical parts are calculated from the calculated center coordinates, and finally the calculated position of the axial line is compared with the calculated position of the other axial line in a certain determination area, to determine the coaxial relation between the two mechanical parts.

According to another feature of the invention, the image information are shot by the camera, wherein a focal distance is fixed and the camera is moved in the axial direction of the mechanical parts. The coordinates of the respective image information in the axial line is calculated from a moving distance of the camera in the moving direction.

According to another feature of the invention, the image information is shot by the camera from such a position, at which the camera can take a view of the shapes of the mechanical part at its both axial ends.

According to a further feature of the invention, the image information of the shape at one measuring point is shot more than once, and the coordinate of the shape are calculated as an average amount of those multiple image information.

According to a further feature of the invention, when the positions of the axial lines of the two mechanical parts, one of the axial line is extended so that the positions of the two axial lines can be compared in the same determination area, which has a certain distance in a direction of the axial line.

BRIEF DESCRIPTION OF THE DRAWINGS

The above and other objects, features and advantages of the present invention will become more apparent from the following detailed description made with reference to the accompanying drawings. In the drawings:

FIG. 4 is a flow chart showing the process of calculating the coaxial relation; and FIG. 5 is a chart for explaining a process for calculating a center from image information.

DETAILED DESCRIPTION OF THE PREFERRED EMBODIMENTS

The present invention will be explained below with reference to the embodiment.

Figure 1:
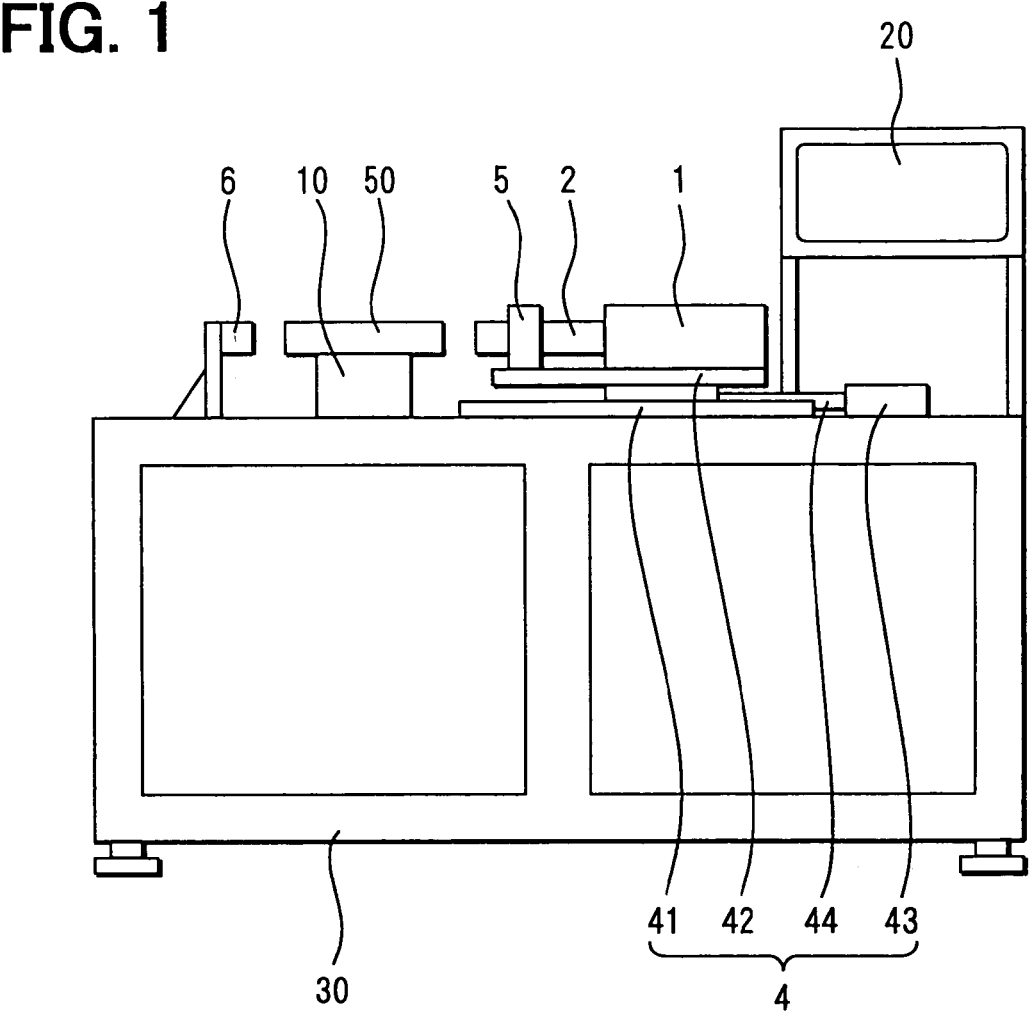
FIG. 1 is a schematic view of a coaxial relation measuring apparatus according to an embodiment of the present invention.
Figure 2:
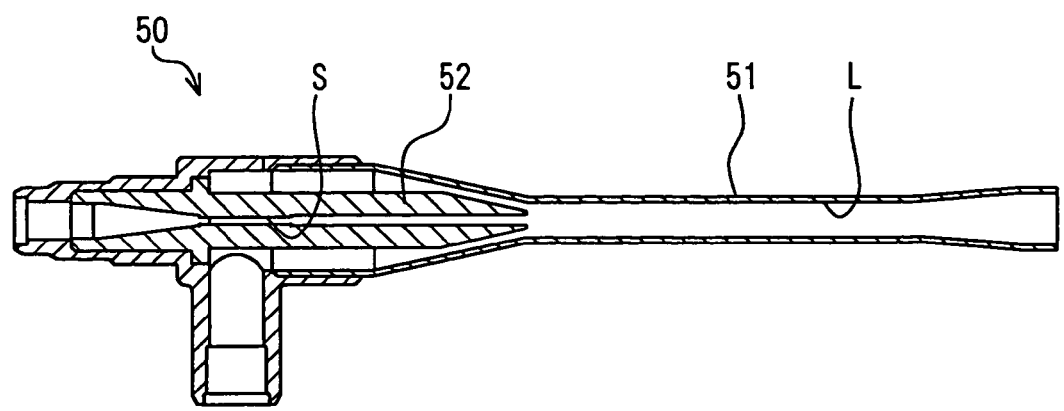
FIG. 2 is a schematic cross sectional view of an ejector 50 which is a measuring object in the embodiment of the present invention.

FIG. 1 is a schematic view of a coaxial relation measuring apparatus according to the embodiment of the present invention, and FIG. 2 is a schematic cross sectional view showing an ejector 50, for which an coaxial relation will be measured.

As shown in FIG. 2, the ejector 50 comprises an outer nozzle 51 and an inner nozzle 52, wherein the ejector 50 is arranged in a refrigerating cycle called as an ejector cycle. The inner nozzle 52 converts pressure energy of high-pressure refrigerant discharged from a heat exchanger (an evaporator) into speed energy, so that the refrigerant is depressurized and expanded. The outer nozzle 51 comprises a fluid mixing portion, which sucks gas-phase refrigerant evaporated at the heat exchanger by high-speed fluid flow injected from the inner nozzle and which mixes the refrigerant injected from the inner nozzle 52 and the refrigerant sucked from the evaporator. The outer nozzle 52 further comprises a diffusing portion, which converts the speed energy into the pressure energy to increase the pressure of the refrigerant.

In the ejector 50 of this embodiment, the outer nozzle 51 has a fine pore with a minimum inner diameter of 2.7 mm and a length of 250 mm, while the inner nozzle 52 has a fine pore with a minimum inner diameter of 0.9 mm and a length of 100 mm. It is known that a coaxial relation between an axial line of a cylindrical inner surface L of the outer nozzle 51 and an axial line of a cylindrical inner surface S of the inner nozzle 52 is closely related to refrigerating capacity.

A measuring apparatus for measuring the coaxial relation of the above outer and inner nozzles comprises a camera 1, as shown in FIG. 1, which is carried by a sliding device 4 provided on a table 30. The sliding device 4 comprises a slide base 41 with a sliding rail on the table 30, a slide plate 42 movable on and along the slide base 41, and a servo motor 43 for moving the slide plate 42 in a horizontal direction in the drawing, wherein a driving force of the servo motor 43 is transmitted to the slide plate 42 via screw shaft 44.

A holding table 10 is provided on the table 30 on a left hand side of the sliding device 4 for holding the ejector 50. When the ejector 50 is held by the holding table 10, the axial line(s) of the outer nozzle 51 and the inner nozzle 52 is in an alignment with a direction of the sliding movement of the sliding device 4.

A lens portion 2 is provided to the camera 1 on a side towards the holding table 10, and an illuminating device 5 is also provided to the camera 1 so that it illuminates the ejector 50 when an image of the ejector shape is shot. Another illuminating device 6 is provided on the table 30 at an opposite side of the ejector 50, which likewise illuminates the ejector 50 from the opposite side of the camera 1, when the image of the ejector shape is shot.

A calculating device 3 (not shown in FIG. 1) is provided to the camera 1, to which image information shot by the camera 1 is input and which calculates the coaxial relation from such image information. The calculating device 3 will display the result of such calculation on a monitor device 20.

A process for measuring the coaxial relation of the ejector 50 by the above measuring apparatus will be explained.

Figure 3A:
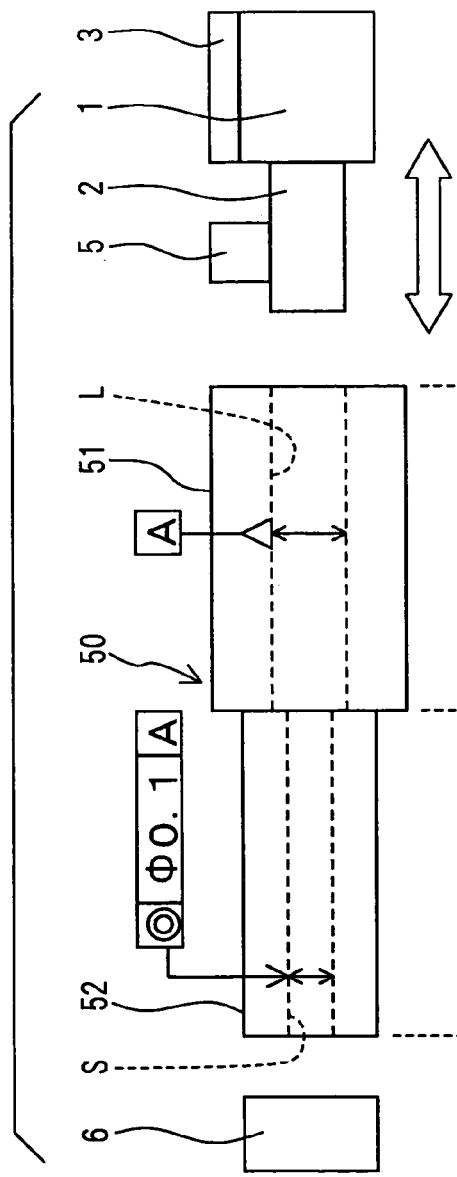
FIG. 3A is a schematic view showing relevant portions of the measuring apparatus and the ejector.
Figure 3B:
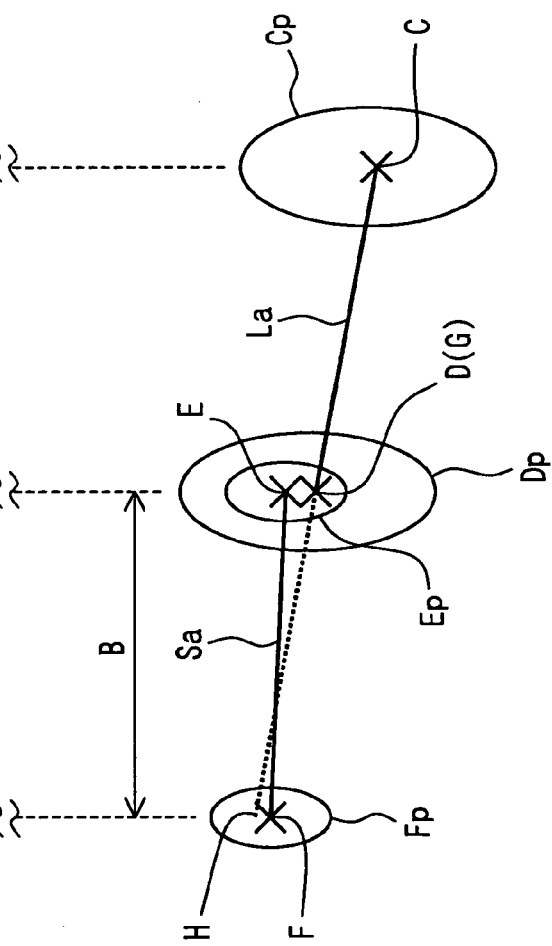
FIG. 3B is an image view for explaining a process of calculating the coaxial relation.

FIG. 3A shows schematically the relevant portions, such as the camera 1, of the measuring apparatus and the ejector 50 as the measuring object, FIG. 3B is an image view for explaining a process of calculating the coaxial relation, and FIG. 4 is a flow chart showing the process of calculating the coaxial relation.

As shown in FIG. 3A, the coaxial relation to be measured in this embodiment is the coaxial relation between an axial line La (first axial line) of the inner surface L (first mechanical part) of the outer nozzle 51 and an axial line Sa (second axial line) of the inner surface S (second mechanical part) of the inner nozzle 52. A target coaxial relation in this embodiment is less than Φ 0.1 in a measuring area B in FIG. 3B, which corresponds to a length of the inner surface S.

As shown in FIG. 4, image information of the ejector shape are shot at four different points by moving the camera 1. More exactly, in the case that the coaxial relation of the axial line Sa to the axial line La is measured, the image information of the both axial ends of the inner surface L of the outer nozzle 51 as well as the image information of the both axial ends of the inner surface S of the inner nozzle 52 are shot by the camera 1, and those four image information are input into the calculating device 3 (Step 101). Namely, the image information of the shapes of those axial ends Cp, Dp, Ep and Fp are shot, as shown in FIG. 3B.

When those four image information Cp, Dp, Ep and Fp are shot, the camera 1 is moved by the sliding device 4 in the horizontal direction in FIG. 3A, during which the focal distance of the camera 1 is fixed. In this process, if the camera 1 is deviated in a direction perpendicular to the moving direction (fluctuation of the camera position), the positions of the input image information Cp, Dp, Ep and Fp are correspondingly fluctuated. Accordingly, the sliding device 4 having a small deviation is used in this embodiment (the deviation is less than 3 μm), so that the fluctuation of the input image information to be possibly caused by the movement of the camera 1 is suppressed.

The illuminating devices 5 and 6 are illuminated to obtain brilliant image information. In this embodiment, the four image information are shot by the camera 1 at a position of the right hand side of the drawing, from which the camera 1 can take a view of the shape of the both axial ends of the respective inner surfaces L and S of the outer and inner nozzles 51 and 52. Accordingly, the four image information Cp, Dp, Ep and Fp can be easily shot by one camera 1.

When the above four image information are input into the calculating device 3, the center coordinates, namely the centers C, D, E and F (shown in FIG. 3B), of the respective image information will be calculated (Step 102). In this step, the center is calculated by an image date processing of an edge of the image information input into the calculating device 3 at the Step 101.

For example, as shown in FIG. 5, in the image information Fp, an area J has a brighter image than an area K, because the illuminating device 6 is illuminated when the image information Fp is shot. A detecting area is set between an inner circle of a one-dot-chain line Js and an outer circle of a one-dot-chain line Ks, wherein such a point will be detected at which the brightness is changed at most in a radial direction (a contrast is at maximum), and such point will be calculated along a circumferential direction. A circular edge of the image information Fp is thus detected and thereby the center F can be calculated.

When calculating the respective center coordinates C, D, E and F, the respective image information are shot by several times (ten times for each center in this embodiment), the center coordinate is calculated for each image information, and an average value of those calculated center coordinates is finally set as the centers C, D, E and F. As above, the fluctuation of the detected center coordinates to be caused by the fluctuation of the image information can be suppressed.

The coordinates of the respective centers C, D, E and F in the axial direction (the coordinates in the horizontal direction in FIG. 3B) can be calculated from a sliding amount of the sliding device 4, since the focal distance of the camera 1 is fixed.

Then, the axial line La, which is shown in FIG. 3B, is calculated from the coordinates of the centers C and D (Step 103). And the axial line Sa shown in FIG. 3B is likewise calculated from the coordinates of the centers E and F. As the coordinates of the centers E and F are already calculated as above, it is not always necessary to further calculate the axial line Sa in the following steps.

When the axial line La is calculated in the Step 103, its line is extended in a determination area B, as indicated by a dotted line in FIG. 3B. And coordinates of intersecting points G and H will be calculated, wherein the intersecting points G and H mean those points of the extended line (La) intersecting with planes which are located at both sides of the determination area B and perpendicular to the moving (sliding) direction of the sliding device 4 (Step 104).

Then distance (deviations) between the center coordinate E and the calculated coordinate G, as well as the distance between the center coordinate F and the calculated coordinate H are respectively calculated. The distances at both sides of the determination area B will be compared and the amount of the distance, which is larger than the other distance, will be doubled. This doubled amount is determined whether it is within a predetermined range, to check the quality of the products with respect to the coaxial relation (Step 106). In this embodiment, when the above doubled amount is less than 0.1 mm, it is determined that the inner surfaces L and S of the outer and inner nozzles 51 and 52 are in a good coaxial relation. Those doubled amount and the determination result are displayed on the monitor device 20.

In FIG. 4, the step 101 is a step for shooting the shapes at four different measuring points, which comprises a first shooting step for shooting the shape of the inner surface L of the outer nozzle 51 at its axial ends to obtain the image information Cp and Dp, and a second shooting step for shooting the shape of the inner surface S of the inner nozzle 52 at its axial ends to obtain the image information Ep and Fp.

The step 102 is a step for calculating center coordinates, which comprises a first coordinate calculation step for respectively calculating a center coordinate C and D of the detected shape from the image information Cp and Dp, and a second coordinate calculation step for respectively calculating a center coordinate E and F of the detected shape from the image information Ep and Fp.

The step 103 is a step for calculating axial lines, which comprises a first axial line calculation step for calculating a position of the first axial line La from the calculated center coordinates C and D, and a second axial line calculation step for calculating a position of the second axial line Sa from the calculated center coordinates E and F.

The steps 104, 105 and 106 constitute a step for determining the coaxial relation between the first and second axial line La and Sa.

According to the above described method and apparatus, the shapes of the inner surfaces L and S of the outer and inner nozzles 51 and 52 at their respective axial ends can be shot by the camera 1, and the axial lines La and Sa can be calculated from the image information (Cp, Dp, Ep and Fp) obtained from the camera 1. As a result, the coaxial relation between two mechanical parts (the outer and inner nozzles) can be measured and determined, without using the contact-type measuring device. And even when the inner surfaces L and S of the nozzles 51 and 52 are long in the longitudinal direction and have a small inner diameter, the coaxial relation can be accurately measured and calculated through the image data processing.

OTHER EMBODIMENTS

In the above embodiment, the coaxial relation of the axial line Sa of the inner surface S (the second mechanical part) of the cylindrical inner nozzle 52 with respect to the axial line La (a reference line) of the inner surface L (the first mechanical part) of the cylindrical outer nozzle 51 is measured. The measuring process of this invention, however, shall not be limited to such cylindrical mechanical parts. For example, the coaxial relation for the axial lines of the parts having rectangular inner surfaces can be also measured. Furthermore, the inner surfaces may have tapered surfaces.

Further, the coaxial relation between the axial lines of outer surfaces of two mechanical parts (or two mechanical portions of one part) can be likewise measured by the apparatus of this invention.

The inner surfaces and/or outer surfaces to be measured shall not be the whole continuous straight surfaces of those mechanical parts. Instead, a portion of the inner and/or outer surfaces in the longitudinal direction can be measured to determine the coaxial relation. For example, in the above described embodiment, a longitudinal portion of the inner surface S of the inner nozzle 52 can be measured, in case that the coaxial relation shall be measured for such longitudinal portion. The determination area B shall not always mean the actual axial ends of the mechanical part.

In the above embodiment, two axial lines La and Sa are measured and calculated to determine whether they are within a predetermined coaxial relational range. The present invention, however, can be also used for measuring and calculating the axial lines more than two.

In the above embodiment, the focal distance of the camera 1 is fixed and the camera 1 is moved. However, the center coordinates can be also measured and calculated by such a modified apparatus, in which the camera 1 is fixed and the focal distance is changed depending on the points, at which the image information should be shot, so that the coordinate in the horizontal direction can be calculated based on the change of the focal distances. However, the accuracy for calculating the center coordinates can be more easily obtained in the case the horizontal coordinate is calculated from the sliding distance of the camera than the case in which the horizontal coordinate is calculated from the change of the focal distances.

In the above embodiment, the image information are shot by one camera 1, which is located at such a position from which the camera can take a view of the shapes to be shot, namely both ends of the inner surfaces L and S of the outer and inner nozzles 51 and 52. A pair of camera can be provided at both sides of the measuring object, to shoot the respective image information from the both sides.

In the above embodiment, the center of the image information is calculated by detecting the edge of the image. However, the center can be calculated from a center of mass of the image information. This method is more preferable when the center shall be calculated for the image information in which the shape of the image has other configurations than the circle.

What is claimed is:

1. A method for measuring a coaxial relation for a measuring object, which comprises:

a first mechanical part having a first axial line as a reference line; and a second mechanical part having a second axial line, wherein a coaxial relation of the second axial line is measured with respect to the reference line, wherein the measuring method comprises:

a first shooting step for shooting a shape of the first mechanical part at multiple measuring points which are displaced in the first axial line, to obtain first image information of the shapes at those measuring points;

a first coordinate calculation step for respectively calculating first center coordinates of the detected shape from the first image information;

a first axial line calculation step for calculating a position of the first axial line from the calculated first center coordinates;

a second shooting step for shooting a shape of the second mechanical part at multiple measuring points which are displaced in the second axial line, to obtain second image information of the shapes at those measuring points;

a second coordinate calculation step for respectively calculating second center coordinates of the detected shape from the second image information;

a second axial line calculation step for calculating a position of the second axial line from the calculated second center coordinates; and a step of determining the coaxial relation by comparing the calculated position of the second axial line with the calculated position of the first axial line in a determination area.

2. A method for measuring a coaxial relation according to claim 1, wherein
at least one of the first and second mechanical parts is constituted by a cylindrical inner surface, and
at least one of the axial lines is an axial line of the cylindrical inner surface.

3. A method for measuring a coaxial relation according to claim 1, wherein
the image information is shot by a shooting device, in which a focal distance is fixed and the shooting device is moved in a moving direction substantially equal to or similar to the first axial line, and
the coordinates of the respective image information in the first and second axial lines are calculated from a moving distance of the shooting device in the moving direction.

4. A method for measuring a coaxial relation according to claim 1, wherein
the measuring points for the first mechanical part are both axial ends of the first axial line, and
the measuring points for the second mechanical part are both axial ends of the second axial line.

5. A method for measuring a coaxial relation according to claim 4, wherein
the image information is shot by a shooting device which is located at a position from which the shooting device can take a view of the shapes of the first mechanical part at both axial ends of the first axial line, and
the image information is shot by a shooting device which is located at a position from which the shooting device can take a view of the shapes of the second mechanical part at both axial ends of the second axial line.

6. A method for measuring a coaxial relation according to claim 4, wherein
the image information of the shapes at the respective measuring points for the first and second mechanical parts are shot by more than once at the first and second shooting step,
the center coordinate for the respective shapes is calculated for each of multiple image information at the same measuring point, and the average value is finally set as the center coordinates of the respective shapes, at the first and second coordinate calculation step, and
the positions of the first and second axial lines are respectively calculated from the average values of the first and second coordinates, at the first and second axial line calculation step.

7. An apparatus for measuring a coaxial relation for a measuring object, which comprises:
a first mechanical part having a first axial line as a reference line; and
a second mechanical part having a second axial line, wherein a coaxial relation of the second axial line is measured with respect to the reference line,
wherein the measuring apparatus comprises:
a shooting device for shooting a shape of the first mechanical part in a direction of the first axial line and at multiple measuring points which are displaced in the first axial line, to obtain first image information of the shapes at those measuring points, and also for shooting a shape of the second mechanical part in a direction of the second axial line and at multiple measuring points which are displaced in the second axial line, to obtain second image information of the shapes at those measuring points; and
a calculating device for respectively calculating first and second center coordinates of the detected shape from the first and second image information, for respectively calculating positions of the first and second axial lines from calculated first and second center coordinates, and for determining the coaxial relation by comparing the calculated position of the second axial line with the calculated position of the first axial line in a determination area.

8. An apparatus for measuring a coaxial relation according to claim 7, wherein
at least one of the first and second mechanical parts is constituted by a cylindrical inner surface, and
at least one of the axial lines is an axial line of the cylindrical inner surface.

9. An apparatus for measuring a coaxial relation according to claim 7, wherein
a focal distance of the shooting device is fixed and the shooting device is moved in a moving direction substantially equal to or similar to the first axial line, and
the coordinates of the respective image information in the first and second axial lines are calculated from a moving distance of the shooting device in the moving direction.

10. An apparatus for measuring a coaxial relation according to claim 7, wherein
the measuring points for the first mechanical part are both axial ends of the first axial line, and
the measuring points for the second mechanical part are both axial ends of the second axial line.

11. An apparatus for measuring a coaxial relation according to claim 10, wherein
the image information is shot by the shooting device which is located at a position from which the shooting device can take a view of the shapes of the first mechanical part at both axial ends of the first axial line, and
the image information is also shot by the shooting device which is located at a position from which the shooting device can take a view of the shapes of the second mechanical part at both axial ends of the second axial line.

12. A method for measuring a coaxial relation according to claim 10, wherein
the image information of the shapes at the respective measuring points for the first and second mechanical parts are shot by more than once,
the center coordinate for the respective shapes is calculated for each of multiple image information at the same measuring point, and the average value is finally set as the center coordinates of the respective shapes, and
the positions of the first and second axial lines are respectively calculated from the average values of the first and second coordinates.

* * * * *